(12) United States Patent
Nowak et al.

(10) Patent No.: US 6,429,447 B1
(45) Date of Patent: Aug. 6, 2002

(54) FLUID LEVEL INDICATOR

(75) Inventors: David R. Nowak, Bloomingdale; Ryan Lindsay, Hampshire, both of IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/328,715

(22) Filed: Jun. 9, 1999

(51) Int. Cl.[7] .................................................. G02B 5/14
(52) U.S. Cl. ...................... 250/573; 250/577; 250/902; 73/293; 340/618; 356/133
(58) Field of Search .................. 250/573, 577, 250/902, 903, 905; 73/293, 290 R; 340/618, 619; 356/133

(56) References Cited

U.S. PATENT DOCUMENTS

| | | |
|---|---|---|
| 3,120,125 A | 2/1964 | Vasel |
| 3,568,628 A | 3/1971 | Erickson |
| 3,648,521 A * | 3/1972 | Amendolia ................. 73/293 |
| 3,794,428 A * | 2/1974 | Giesecke ................... 356/156 |
| 3,893,339 A | 7/1975 | Melone |
| 4,187,025 A | 2/1980 | Harmer |
| 4,242,590 A | 12/1980 | von Tlück |
| 4,256,403 A * | 3/1981 | Powell ........................ 73/293 |
| 4,353,252 A | 10/1982 | Jeans |
| 4,358,960 A | 11/1982 | Porter |
| 4,625,549 A | 12/1986 | Mahoney |
| 4,670,660 A | 6/1987 | Kuhlen et al. |
| 4,694,161 A | 9/1987 | Sackett |
| 4,834,533 A | 5/1989 | Horike et al. |
| 4,878,383 A | 11/1989 | Wiegand, Jr. et al. |
| 4,994,682 A * | 2/1991 | Woodside ................... 250/577 |
| 5,077,482 A | 12/1991 | Vali et al. |
| 6,173,609 B1 * | 1/2001 | Modlin et al. ............. 250/577 |

* cited by examiner

Primary Examiner—Stephone Allen
(74) Attorney, Agent, or Firm—Pauley Petersen Kinne & Erickson

(57) ABSTRACT

An optical device for measuring a level of a fluid in a container wherein a light conducting body having a top surface and a bottom surface is positioned within the container and into the fluid. A first end of the light conducting body and an oppositely disposed second end, preferably having stepped end surfaces, reflect and refract light in a predetermined manner based upon the fluid level in the container. A resulting brightness of the top surface is therefore inversely proportional to the level of the fluid. Such an optical device is particularly suited toward application to a vehicle fuel tank.

19 Claims, 5 Drawing Sheets

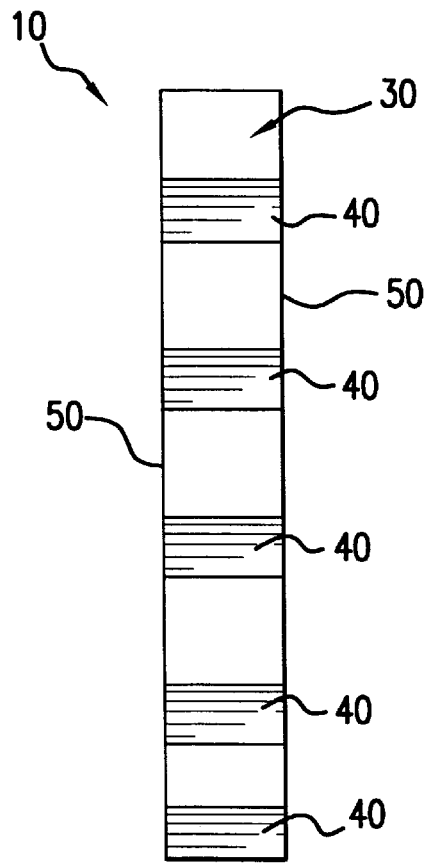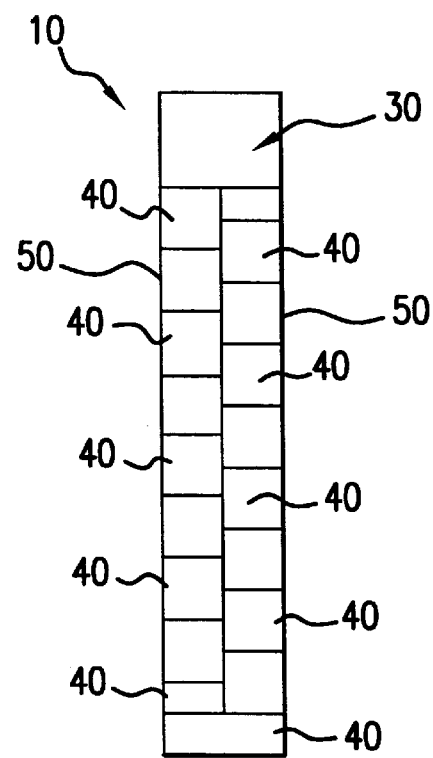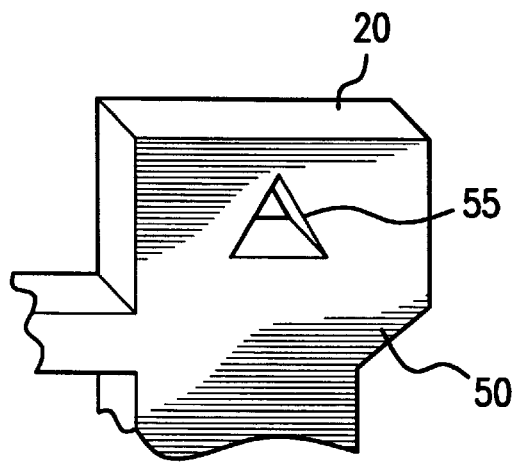

FLUID LEVEL INDICATOR

BACKGROUND OF THE INVENTION

1. Field of the Invention

This invention relates to an optical device for detecting a fluid level in a container.

2. Description of Prior Art

Fluid level sensors, particularly for application to gasoline tanks, are susceptible to contamination from immersion in fluid, interference from splashing fluid adversely effecting output accuracy, malfunction resulting from an abundance of moving parts and other potential malfunctions and/or erroneous readings.

Fluid level sensors for use in fuel tanks, such as in automobiles, typically rely upon a float arm connected with respect to a laser-etched card resulting in a variable resistance provided to an output sensor depending upon the relative position of the float arm in the fuel. This float arm method is widely used and accepted although it relies upon moving parts and a precision-etched sensor that is difficult to accurately manufacture.

Other prior art methods of fluid level detection attempted for use in connection with fuel tanks include an electrode used to measure fluid level based upon variation in capacitance around the electrode; a sensitive measuring diaphragm for measuring pressure created by the weight of the fluid; an ultrasonic transmitter for generating sound pressure waves reflected from the fluid surface; a microwave transmitter and receiver relying upon a dampened energy signal based upon variation of fluid level; a weight suspended from a measurable cable length repeatedly lowered into the fluid to determine the fluid level; and a series of simple circuits formed by the fluid level and a sensing probe provided with a low AC voltage. The above devices and methods for determining fluid level in a fuel tank all rely upon moving parts, expensive electronics or devices that are not adaptable to wide variations of fuel tank sizes and configurations.

SUMMARY OF THE INVENTION

The present invention relates to an optical device wherein a brightness displayed in a top surface of the optical device is inversely proportional to the percent of the device submerged in liquid. The higher the liquid level, the darker the optical device appears.

The optical device operates by light reflection. When an angled surface within a specific range of angles is under liquid, it does not reflect light, it refracts light. The optical device according to this invention relies upon the principles of total internal reflection. An optical device, such as a light pipe, having an angled surface between approximately 40° and 60° relative to normal will permit all light to internally reflect. In a typical light pipe having an index of refraction of 1.5, if the index of refraction of the material on the other side of the angled surface is lower than 1.5, such as the index of refraction of most gases including air, there will be total internal reflection. As the index of refraction of the material on the other side of the angled surface approaches 1.5, such as many liquids including water and gasoline, light will pass through the angled surface and be refracted. Therefore, if the optical device according to this invention is immersed in liquid, such as gasoline, light will not be reflected from one angled surface to another, but instead absorbed into the liquid.

By increasing the number of surfaces submerged, the amount of light reflected decreases. By increasing the total number of reflecting surfaces, the resolution of the device can be increased. The overall length can be varied for specific depth tanks. By varying these two parameters, the device can be configured in an optimal manner for each type of level sensing application.

The brightness of the optical device can be viewed by eye, or can be sensed electronically for a more accurate reading. By coloring the reflective surfaces, the device can be viewed as a change in color, instead of a change in intensity. The optical device can be coupled to a fiber optic and viewed remotely either by visual inspection or electronic conversion.

It is one object of this invention to provide an optical device for measuring fluid level that does not rely upon moving parts or complex electronics.

It is another object of this invention to provide an optical device for measuring fluid level that provides an instantaneous output of current fluid level.

It is another object of this invention to provide an optical device for measuring fluid level that provides accurate, incremental fluid level readings without appreciable interference from splash.

It is still another object of this invention to provide a device for use in connection with a variety of fuel tank sizes and configurations.

It is another object of this invention to provide a device for measuring fluid level that is capable of displaying the fluid level directly or into an electronic receiver.

It is yet another object of this invention to provide a device for measuring fluid level in fuel tanks that is durable and inexpensive.

BRIEF DESCRIPTION OF THE DRAWINGS

The above-mentioned and other features and objects of this invention will be better understood from the following detailed description taken in conjunction with the drawings wherein:

FIG. 3 is a diagrammatic side view of the optical device shown in FIG. 1;

FIG. 4 is a diagrammatic side view of an optical device according to one preferred embodiment of this invention;

FIG. 5 is a detail view of an angled cutout according to one preferred embodiment of this invention;

DESCRIPTION OF PREFERRED EMBODIMENTS

Figure 1:
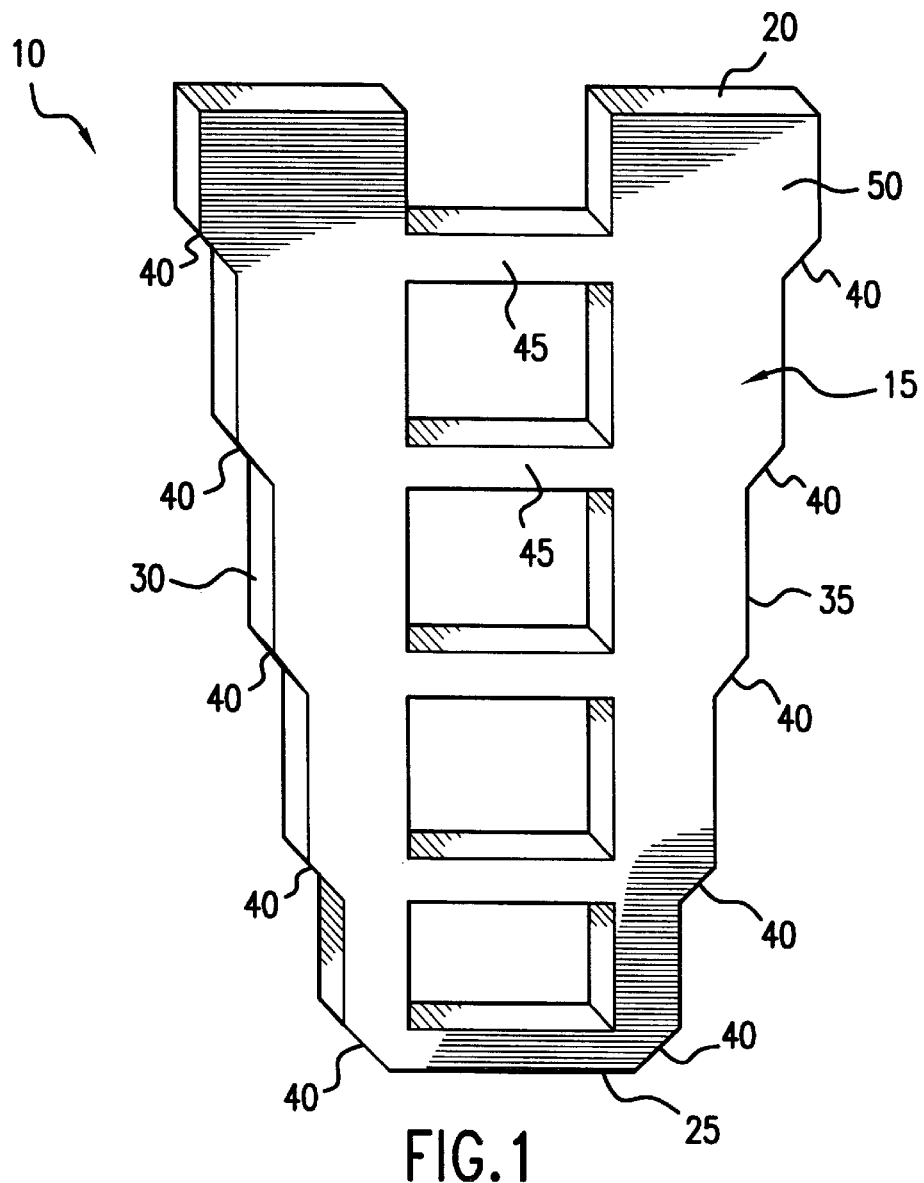
FIG. 1 is a diagrammatic perspective view of an optical device according to one preferred embodiment of this invention.
Figure 2:
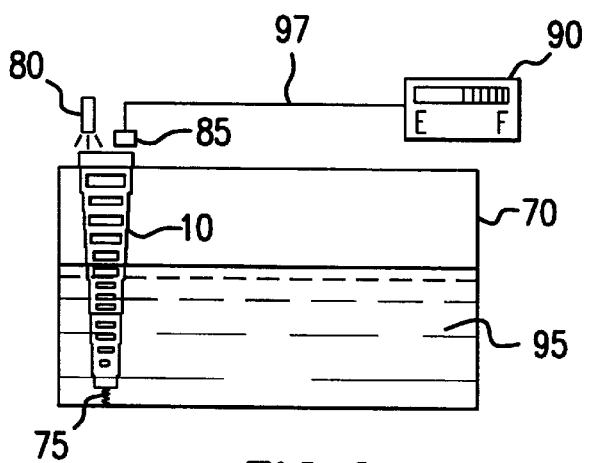
FIG. 2 is a simplified schematic representation of a system employing an optical device according to one preferred embodiment of this invention.

FIG. 1 shows optical device 10 for measuring a fluid level in a container according to one preferred embodiment of this invention. Container 70, as shown in FIG. 2, is preferably, though not necessarily a fuel tank such as for use in connection with a vehicle. However, optical device 10 is intended for a variety of uses that require fluid level detection and a fuel tank, as described in the subsequent specification, is used only by example.

Optical device 10 preferably comprises a light conducting body 15 having top surface 20, bottom surface 25, first end 30 and second end 35. Light conducting body 15 is preferably molded from nylon 12, styrene acrylonitrile (SAN) for liquids other than fuel, or similar workable, light conducting material known to those having ordinary skill in the art. As shown in FIG. 1, according to one preferred embodiment of this invention, top surface 20 and bottom surface 25 are generally planar surfaces.

A plurality of stepped end surfaces 40 are preferably formed on each of first end 30 and second end 35. A side view of one preferred embodiment of stepped end surfaces 40 is shown in FIG. 3. Stepped end surfaces 40 are preferably formed at an angle between approximately 40° and 60° with respect to the normal of incoming light, in this case from top surface 20. The minimum angle to the normal in which all light will reflect is approximately 40° for air and approximately 60° for liquid. Angles under 40° result in increasing percentages of light lost to refraction.

According to one preferred embodiment of this invention, a plurality of ribs 45 are formed in light conducting body 15 between first end 30 and second end 35. Such ribs 45 are preferably arranged to have a thickness and position corresponding with a height of stepped end surface 40 of first end 30 and second end 35. Therefore, internally reflected light preferably passes through one or more ribs 45 within light conducting body 15. As a result of ribs 45, gaps are necessarily formed between first end 30 and second end 35. Such gaps permit light to transfer only in desired planes.

Figure 9:
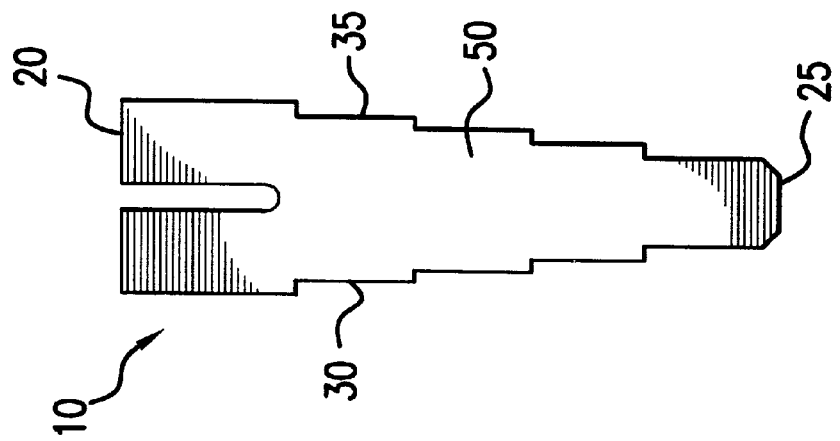
FIG. 9 is a front view of an optical device according to one preferred embodiment of this invention.

Although other cross-sections are viable, according to one preferred embodiment of this invention, first end 30 is separated from second end 35 by two generally planar surfaces 50. Cross-section of first end 30 and second end 35 may alternatively be round or any other preferred cross-section that improves desired light transmission. Additional embodiments of optical device 10 are shown in FIGS. 9, 10 and 11.

Figure 11:
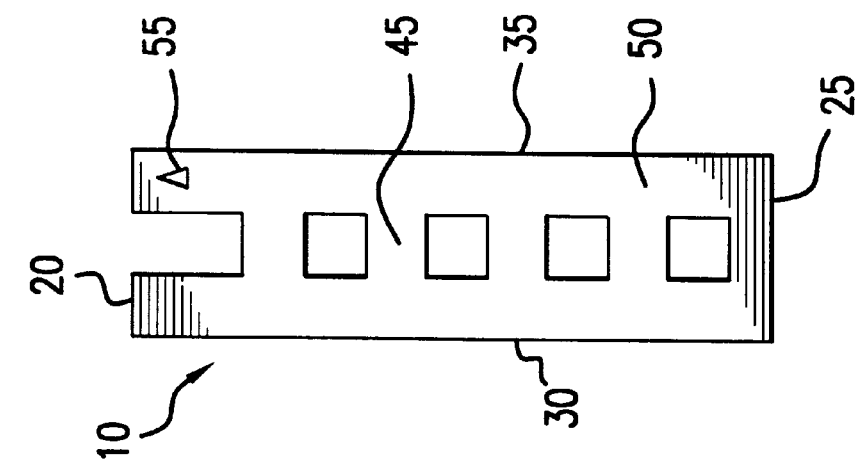
FIG. 11 is a front view of an optical device according to one preferred embodiment of this invention.
Figure 10:
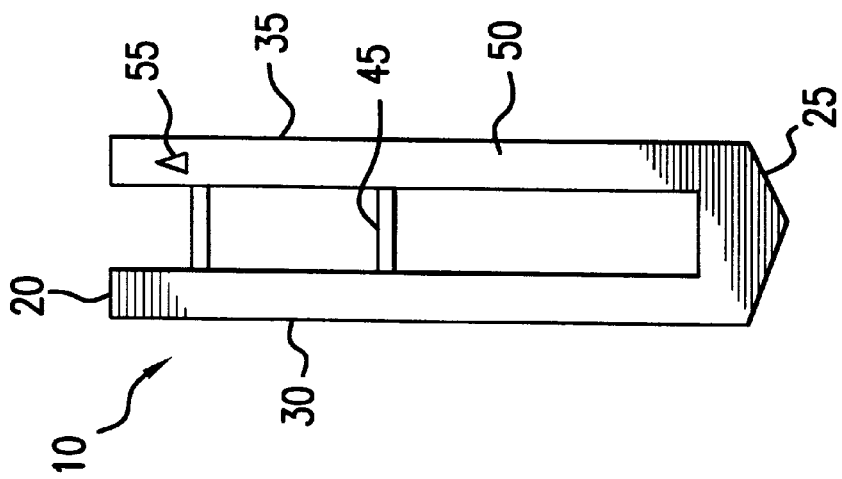
FIG. 10 is a front view of an optical device according to one preferred embodiment of this invention.

As shown in FIGS. 5, 10 and 11, according to one preferred embodiment of this invention, optical device 10 further comprises angled cutout 55 formed through light conducting body 15 adjacent to top surface 20. Angled cutout 55 directs incoming light into the preferred range of angles discussed above.

As the number of stepped end surfaces 40 are correspondingly increased on each of first end 30 and second end 35, resolution of optical device 10 is improved. Therefore, a greater number of incremental output readings are available for an increased number of specific fluid levels within container 70. The embodiments of optical device 10 shown in the Figures are shown for clarity. An optical device 10 having a practical resolution would preferably include fifty or more stepped end surfaces 40 to enable a correspondingly large range of possible output readings. This is especially important in a fuel tank wherein a sudden drop in an output gauge from ⅛ full to empty can create serious problems for the user.

Alternatively, as shown in FIG. 4, stepped end surfaces 40 are aligned in at least two columns along each of first end 30 and second end 35. In one preferred embodiment of this invention, stepped end surfaces 40 in each column are preferably staggered with respect to stepped end surfaces 40 in each other column. Such an arrangement increases the resolution of the output of optical device 10 without adding unnecessary material or size to optical device 10.

Figure 6:
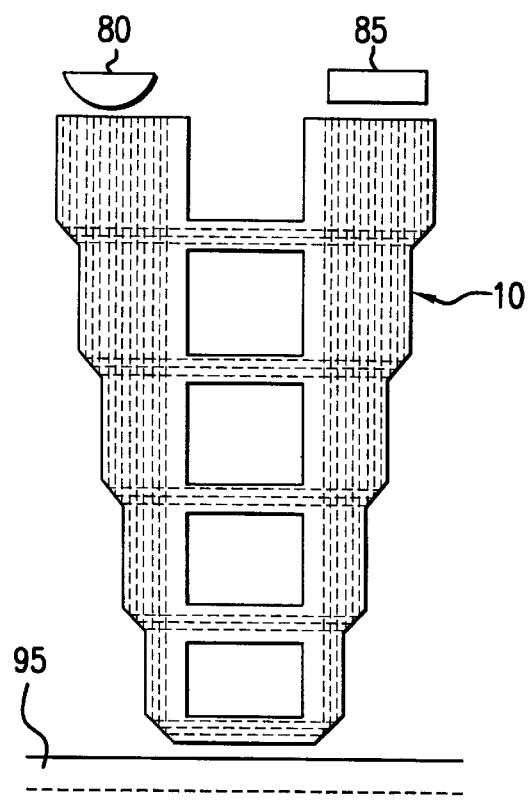
FIG. 6 is a simplified schematic representation of an optical device not submerged in fluid.
Figure 7:
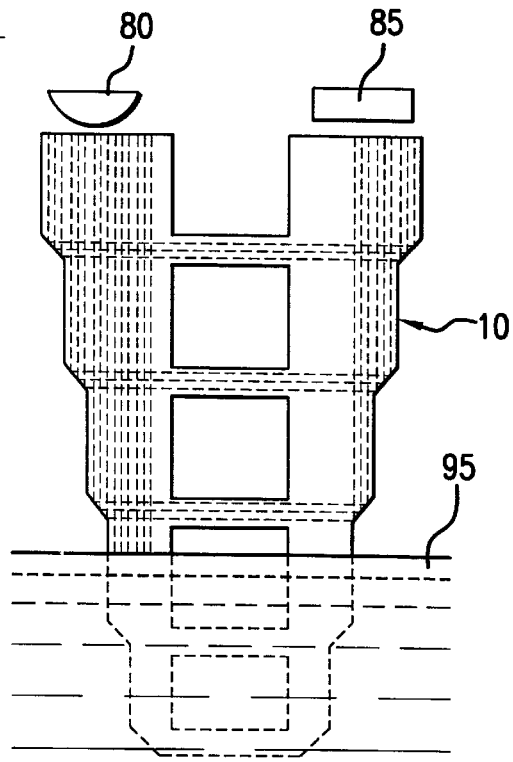
FIG. 7 is a simplified schematic representation of an optical device partially submerged in fluid.
Figure 8:
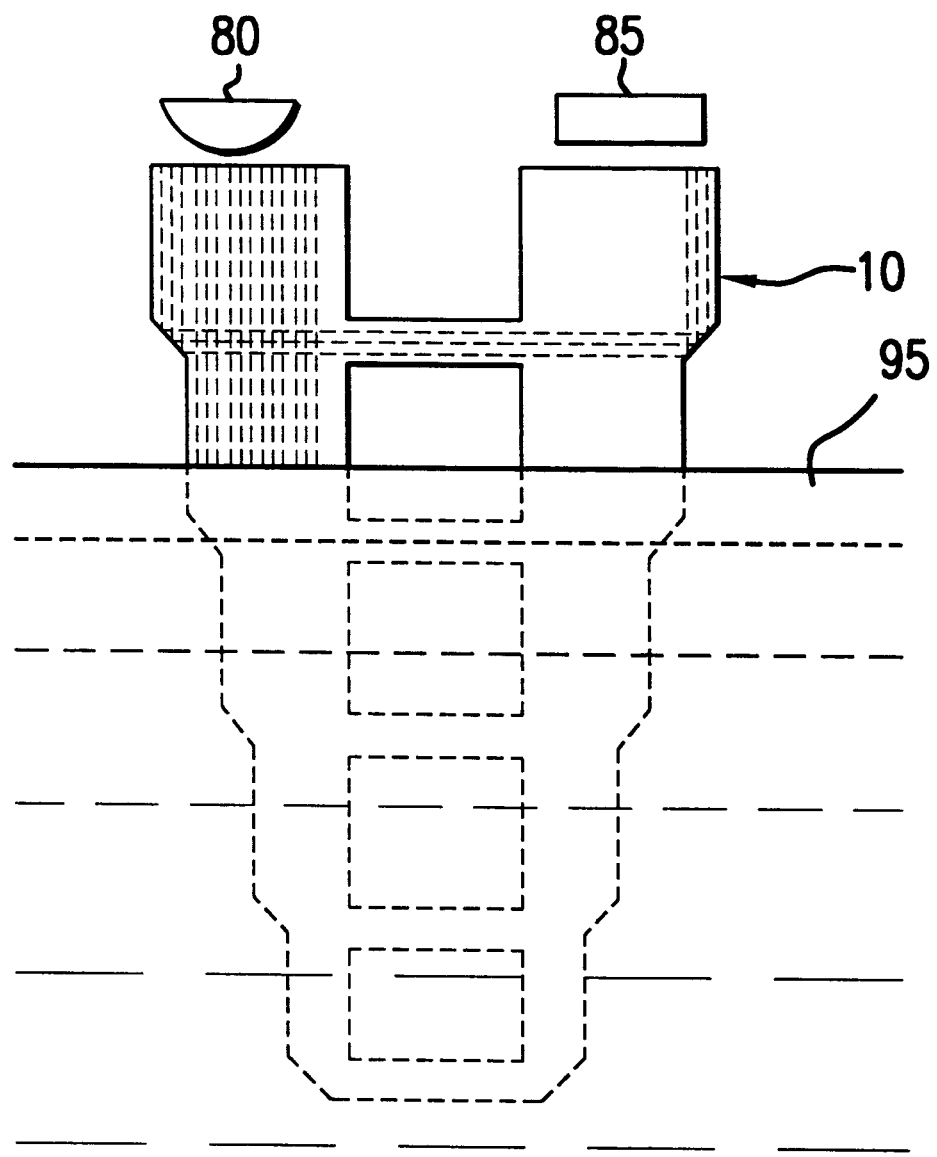
FIG. 8 is a simplified schematic representation of an optical device partially submerged in fluid.

In a system employing optical device 10 for measuring a level of a fluid in container 70, bottom surface 25 is positioned within container 70 and extends into the fluid, as shown schematically in FIG. 2. First end 30 and an oppositely disposed second end 35 have a plurality of stepped end surfaces 40 forming a generally tapered profile such that bottom surface 25 is, in one preferred embodiment of this invention, narrower than top surface 20. A resulting brightness of top surface 20 is inversely proportional to the level of the fluid within container 70. The resulting brightness is schematically shown in FIGS. 6–8, which show a representation of the passage of light from light source 80 through optical body 10 as a function of level of liquid 95.

As shown in FIGS. 2 and 6–8, according to one preferred embodiment of this invention, light source 80 is positioned adjacent top surface 20 of light conducting body 15. In another preferred embodiment of this invention, light receiving device 85 is additionally or alternatively positioned adjacent top surface 20 of light conducting body 15. Light receiving device 85 may comprise an electronic sensor, such as a photodiode, or a mechanical connection such as fiber optic cable 97. A mechanical connection, such as fiber optic cable 97, enables direct translation of the brightness output from top surface 20 of optical device 10 to an output gauge 90. In one preferred embodiment of this invention, shown in FIG. 2, optical device 10 is connected through fiber optic cable 97 directly to output gauge 90 in a dashboard of a vehicle. As described, optical device 10 may alternatively connect with respect to the vehicle's on-board computer (not shown).

In one preferred embodiment of this invention especially suited for application to a direct connection between optical device 10 and output gauge 90, at least one of the stepped end surfaces 40 may be colored. By coloring one or more stepped end surface 40, output gauge 90 may vary in color to indicate fluid levels within container 70.

Bottom surface 25 is preferably spring biased, such as with spring 75, with respect to an inside surface of container 70. Such a spring biased connection permits container 70 to flex, expand and/or contract without affecting the integrity or the output of optical device 10. Optical device may extend into container 70 in a generally vertical manner or at any angle suitable for installation.

While in the foregoing specification this invention has been described in relation to certain preferred embodiments thereof, and many details have been set forth for purpose of illustration, it will be apparent to those skilled in the art that the device according to this invention are susceptible to additional embodiments and that certain of the details described herein can be varied considerably without departing from the basic principles of the invention.

We claim:

1. An optical device for measuring a fluid level in a container, the optical device comprising:
   a light conducting body having a top surface, a bottom surface, a first end and a second end;
   a plurality of stepped end surfaces formed on each of the first end and the second end, the stepped end surfaces arrayed in one or more columns along a periphery of the light conducting body; and
   a brightness of the top surface inversely proportional to an amount of the light conducting body submerged in fluid, wherein the fluid level is detected along an entire length of the light conducting body between the top surface to the bottom surface.

2. The optical device of claim 1 further comprising a plurality of ribs formed in the light conducting body between the first end and the second end.

3. The optical device of claim 1 wherein each stepped end surface is formed at an angle between approximately 40° and 60° with respect to the top surface.

4. The optical device of claim 1 wherein the bottom surface is spring biased against an inside surface of the container.

5. The optical device of claim 1 further comprising an increased number of stepped end surfaces to improve resolution of a measured fluid level in the container.

6. An optical device for measuring a level of a fluid in a container, the optical device comprising:

a light conducting body having a top surface and a bottom surface positioned within the container and extending into the fluid;

a first end of the light conducting body and an oppositely disposed second end, wherein each of the first end and the second end have a plurality of stepped end surfaces arrayed in one or more columns along a periphery of the light conducting body and forming a generally tapered profile such that the bottom surface is narrower than the top surface; and a brightness of the top surface inversely proportional to the level of the fluid, wherein the fluid level is detected along an entire length of the light conducting body between the top surface to the bottom surface.

7. The optical device of claim 6 further comprising a light source positioned adjacent the top surface of the light conducting body.

8. The optical device of claim 6 wherein at least one of the stepped end surfaces is colored.

9. The optical device of claim 6 wherein at least one of the stepped end surfaces is formed with an angled surface.

10. The optical device of claim 6 wherein the bottom surface is spring biased with respect to an inside surface of the container.

11. The optical device of claim 6 further comprising a light receiving device positioned adjacent the top surface of the light conducting body.

12. The optical device of claim 11 wherein the light receiving device comprises an electronic sensor.

13. An optical device for measuring a level of a fluid in a container, the optical device comprising:

a light conducting body extending into the fluid;

a plurality of stepped end surfaces formed along an outer edge of the light conducting body; and a brightness of the light conducting body proportional to the level of the fluid, wherein the fluid level is detected along an entire length of the light conducting body between the top surface to the bottom surface.

14. The optical device of claim 13 wherein the brightness varies in a top of the light conducting body as the level of the fluid changes.

15. The optical device of claim 14 further comprising a light receiving device positioned adjacent the top of the light conducting body.

16. An optical device for measuring a fluid level in a container, the optical device comprising:

a light conducting body having a top surface, a bottom surface, a first end and a second end;

a plurality of stepped end surfaces formed on each of the first end and the second end, wherein the first end is separated from the second end by two generally planar surfaces; and a brightness of the top surface inversely proportional to an amount of the light conducting body submerged in fluid.

17. An optical device for measuring a fluid level in a container, the optical device comprising:

a light conducting body having a top surface, a bottom surface, a first end and a second end, wherein an angled cutout is formed through the light conducting body adjacent to the top surface;

a plurality of stepped end surfaces formed on each of the first end and the second end; and a brightness of the top surface inversely proportional to an amount of the light conducting body submerged in fluid.

18. An optical device for measuring a fluid level in a container, the optical device comprising:

a light conducting body having a top surface, a bottom surface, a first end and a second end;

a plurality of stepped end surfaces formed on each of the first end and the second end, wherein the stepped end surfaces are aligned in at least two columns along each of the first end and the second end; and a brightness of the top surface inversely proportional to an amount of the light conducting body submerged in fluid.

19. The optical device of claim 18 wherein the stepped end surfaces in each column are staggered with respect to the stepped end surfaces in each other column.

* * * * *